Sept. 11, 1962   W. R. JEWETT   3,053,078
APPARATUS FOR TESTING BIOLOGICAL AND OTHER FLUIDS
Filed April 17, 1958   2 Sheets-Sheet 1

INVENTOR.
WARREN R. JEWETT
BY
*Kane, Dalsimer and Kane*

ATTORNEY

Sept. 11, 1962 W. R. JEWETT 3,053,078
APPARATUS FOR TESTING BIOLOGICAL AND OTHER FLUIDS
Filed April 17, 1958 2 Sheets-Sheet 2
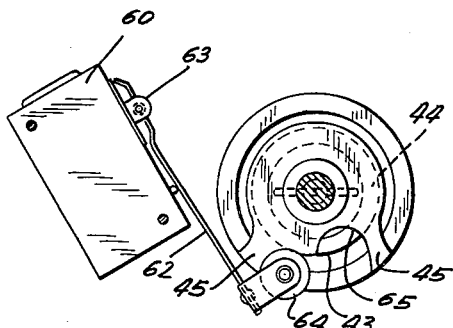
FIG. 4
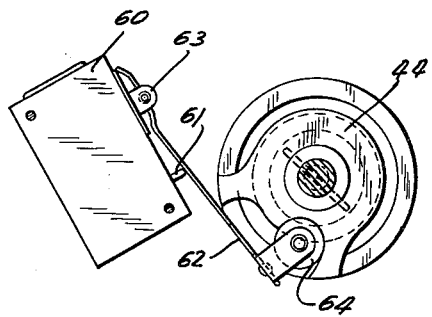
FIG. 5
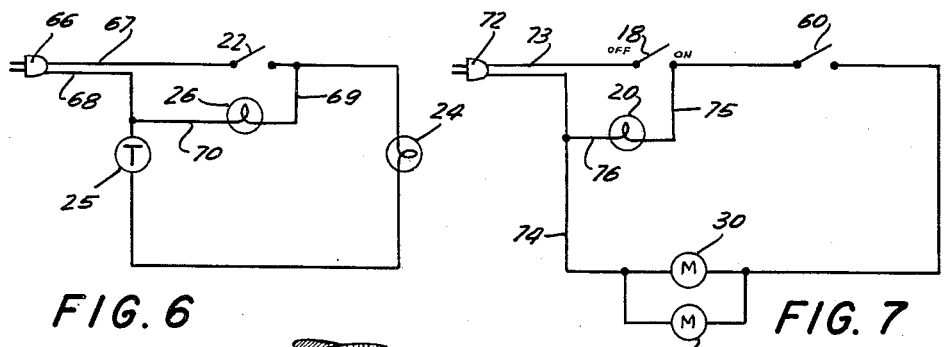
FIG. 6
FIG. 7
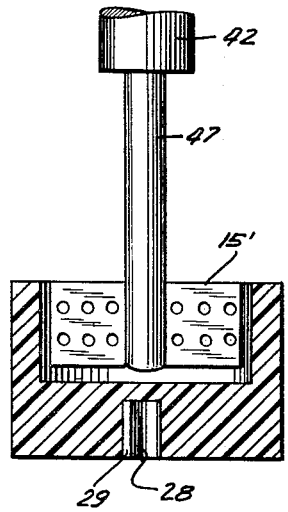
FIG. 8
INVENTOR.
WARREN R. JEWETT
BY
Kane, Dalsimer and Kane
ATTORNEY

United States Patent Office 3,053,078
Patented Sept. 11, 1962

3,053,078
APPARATUS FOR TESTING BIOLOGICAL
AND OTHER FLUIDS
Warren R. Jewett, Race Brook Road, Woodbridge, Conn.
Filed Apr. 17, 1958, Ser. No. 729,179
17 Claims. (Cl. 73—54)

This invention relates to an improved apparatus for testing biological and other fluids and is particularly useful in measuring changes in characteristics in the fluids. Thus my invention is useful in determining changes in viscosity or fluidity of such fluids, and is particularly useful in testing the clotting and coagulation time of whole blood and the prothrombin activity of plasma.

The methods presently in use for determining changes in characteristics of this type in biological and other fluids are far from precise and depend to a great extent upon the skill and experience of the operators. As an example, in the blood coagulating or clotting time test commonly in use, 6 or more cc. of blood must be withdrawn from a vein with a minimum of trauma and without stasis. The time of withdrawing the blood must be recorded and then 2 cc. of blood, free from bubbles, must be placed in each of three test tubes in a warm bath. Thereafter test tube No. 1 is gently tilted every thirty seconds until coagulation occurs, and the time of this occurrence must again be noted. After coagulation has occurred in tube No. 1, the procedure is repeated with tube No. 2, which is again gently tilted every thirty seconds until coagulation occurs, and the time is again noted. Finally the operation is repeated with tube No. 3, which is gently tilted every thirty seconds until coagulation occurs, and the time of this occurrence is likewise recorded. The coagulation time, for the purposes of this test, is considered to be the interval from the venepuncture to coagulation in tube No. 2. Between six and twelve minutes are considered satisfactory time in this test. It will be appreciated that innumerable variations in conditions may occur to vary the results. Thus errors may be made in noting or recording the time. Also there may be variations in the force and the intervals of the tilting of the tubes. In addition, coagulation is a relative characteristic and it is difficult to decide on the precise moment of coagulation.

The prothrombin activity test presently in use presents similar difficulties. Thus in the commonly employed prothrombin test, 4½ cc. of blood are drawn and placed in a test tube with ½ cc. of an anti-coagulant, such as sodium, or potassium citrate, or oxylates, or heparin. The blood in the tube is then centrifuged and the plasma may be tested immediately or stored in the refrigerator for future tests. In conducting the tests, a clean test tube is placed in a water bath at 37° C. Then, 0.1 cc. of clear plasma is placed in the tube, and a platinum wire loop is inserted and gently agitated while 0.2 cc. of reagent is pipetted into the tube. The mixing with the wire loop continues until clotting occurs. The time from the beginning of the mixing until the clotting occurs must be noted. Fifteen seconds are considered satisfactory time in this prothrombin test. It will be noted that variations in results may be obtained with different rates of agitation of the wire loop and with different proportions of plasma and reagent. In addition the operator must endeavor to operate the stop watch, agitate the wire loop, pipette the proper quantity of reagent into the tube, and properly note and record the time with the result that errors or variations may readily occur.

Similar difficulties and lack of precision occur in other tests based on changes in characteristics in biological fluids.

It is an object of the present invention to overcome the difficulties heretofore encountered in the testing of biological and other fluids and to provide an improved apparatus useful in determining changes in characteristics in the fluids, which is accurate and precise in its operation, which eliminates the variable judgment of the operator, and which may be simply operated to automatically indicate the characteristic or the change in the characteristic being tested.

Further objects include the provision of improved apparatus of the above character in which the parts which contact the fluid being tested are readily removable for cleaning and which may be disposable if desired so as to minimize the danger of contamination.

My invention contemplates the rotation, at a predetermined constant rate of speed, of a predetermined quantity of the fluid to be tested in an arrangement of predetermined dimensions. A rotatable mass having predetermined constant inertia and presenting a predetermined resistance to rotation has at least a portion thereof presenting a predetermined surface area in engagement with the fluid being tested. The apparatus can be arranged so as to indicate when the mass is caused to rotate a predetermined distance by the rotating fluid, whereby characteristics and changes in characteristics can be evaluated.

In the accompanying drawings,

FIG. 4 is a sectional plan view in the direction of the arrows on the line 4—4 of FIG. 2, showing the cam associated with the rotatable mass and the micro-switch operated thereby with the switch in its closed position which it assumes at the beginning of a test cycle;

FIG. 5 is a view similar to FIG. 4 with the cam rotated through an arc so as to cause the micro-switch to open, which is its position at the end of the test cycle;

FIG. 6 is a circuit diagram for the heater circuit;

FIG. 7 is a circuit diagram for the motors for operating the timer and container; and FIG. 8 is a sectional detailed view of a modified form of container and paddle assembly which may be used for certain types of tests.

Figure 1:
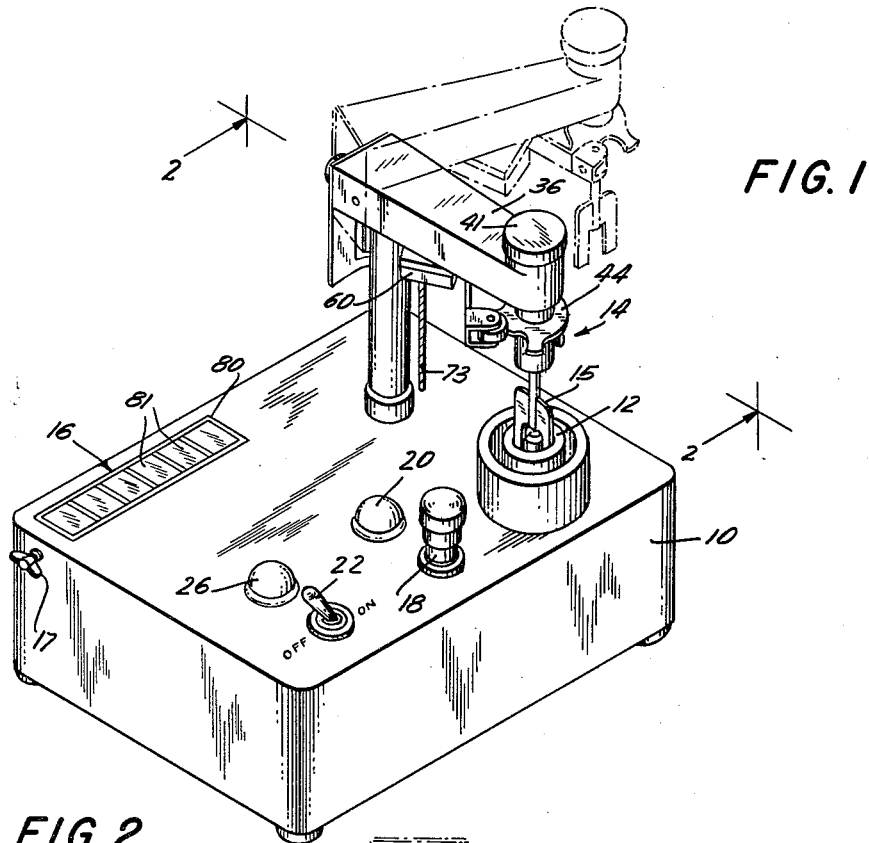
FIG. 1 is a perspective view of apparatus embodying my invention, showing the rotatable mass in its normal operating position in full lines and showing it in elevated position in dotted lines.

My apparatus may be arranged in a convenient compact assembly, such as shown in FIG. 1 and for this purpose it may be mounted in a suitable casing or box 10. The apparatus consists generally of a rotatable container or cup 12 for holding a predetermined quantity of the biological or other fluid being tested, and a rotatable mass indicated generally at 14 having a paddle portion 15, which is disposed in the cup or container when in operative position so as to present a predetermined surface area to the fluid being tested.

A suitable indicator, shown generally by the numeral 16 and which may be a timer, is provided to indicate the completion of the test or the time consumed by the test or the change in the particular characteristic being determined by the test. A handle 17, such as a wing nut, may be provided for resetting the indicator or timer. A manual switch 18, which may be of the push button type as shown, is provided for controlling the motor circuit for rotating the cup 12, and a pilot light 20 may be arranged in parallel circuit to indicate when the manual switch has been turned on. Another manual switch 22, which may be of the toggle type, is provided for controlling the circuit of a heater 24 for heating the cup and the contents thereof. For convenience for indicating when the heater has been turned on, another pilot light 26 is provided in parallel circuit with the heater.

Referring now to the cup 12, it will be seen that it is removably mounted on a shaft 28, which projects upwardly from a gear box and motor assembly 30 mounted inside the casing. The cup has a central aperture projecting upwardly from the under surface thereof which receives the shaft 28 and the shaft and cup are keyed together for rotation by means of a key, such as indicated at 29. To remove the cup, it is simply necessary to lift it upwardly so as to physically disengage it from the shaft; and to replace the cup, the keyed shaft and aperture are brought in proper alignment and the cup is then shifted downwardly. In this manner the cup may be readily removed for cleaning and sterilization; or if desired the cup may be disposable so that it can be replaced by a new cup after each test. If the cup is disposable, it should be made in relatively inexpensive form, such as being molded from plastic. The cup or container is formed with a suitable well or recess 32 to receive the biological or other fluid to be tested. The well or recess of the cup should preferably be made in accurate dimensions so that a predetermined quantity of the fluid to be tested will be disposed in an arrangement of predetermined dimensions. In this connection the quantity of fluid tested is usually quite small; and in order to provide the proper torque for rotating the rotatable mass, I preferably make the recess in annular form surrounding a central lug or filler 33.

Surrounding the cup 12 is a stationary guard or wall 34, which may be mounted on the casing. For certain tests it is desirable to control the temperature of the fluid being tested. Thus in blood coagulation and clotting time tests and in prothrombin activity tests the blood and plasma are preferably maintained at a temperature of approximately 37° C. The heater 24, previously referred to, may be mounted in the guard 34 as shown for the purpose of heating the cup 12 and the contents thereof, and a thermostatic control 25 may also be mounted in the guard preferably diametrically opposite to the heater so as to minimize fluctuations in temperature.

The motor and gear assembly 30 are adapted to rotate the cup at a constant predetermined rate of speed. I have found that a convenient rate of speed for tests of the type indicated and also for timing purposes is a speed of thirty rotations per minute (i.e., one rotation every two seconds).

The rotatable mass 14 has a constant predetermined inertia and presents a constant predetermined initial resistance to rotation. The rotatable mass is supported by bracket arm 36 and for this purpose the outer end of the bracket arm is provided with a central aperture and recess 37 in which a pair of ball bearing assemblies 38 and a spacer 39 may be mounted. Due to the ball bearing mounting for the rotatable mass, frictional forces are minimized and inertia represents the primary resistance to rotation. Extending through the ball bearing assemblies and spacer is a shaft 40 forming the upper portion of the rotatable mass and which is drilled and tapped at its upper end so as to receive the knurled screw 41 for holding the rotatable mass assembly in place in the bracket arm for rotary motion. The shaft 40 projects downwardly beneath the bracket arm as shown and is connected to a cam and collar assembly 42 by means of a set screw 42'. The cam and collar assembly has a projecting flange cam 44 having a cam profile 43 extending through an arc of a predetermined length. The cam profile terminates in stops 45 formed at both ends thereof. Thus it will be seen that when the rotatable mass rotates, the cam flange with the cam profile likewise rotates. The lower end of the cam and collar assembly 42 is formed with a central bore 46 for receiving the shaft 47 of paddle 15. The shaft of the paddle is inserted in the bore and the paddle is releasably held in place by means of set screw 48.

Figure 2:
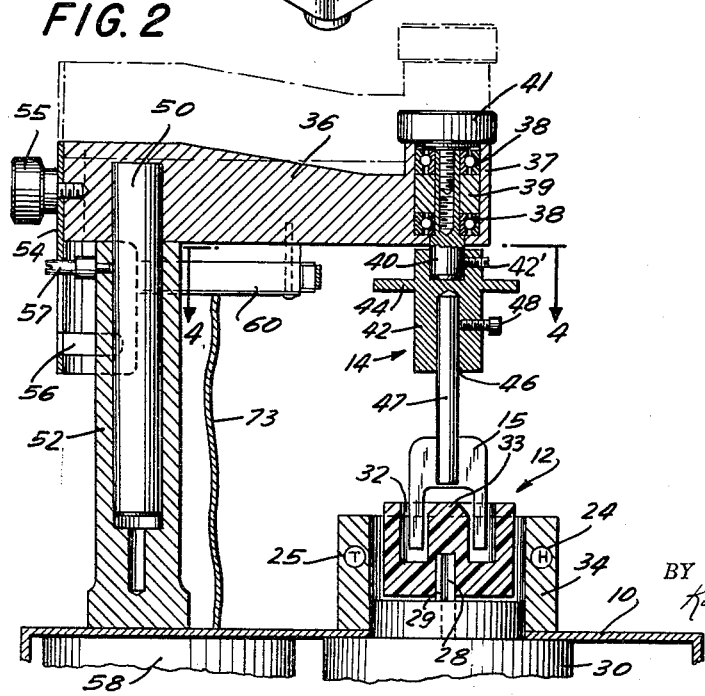
FIG. 2 is a detailed view in section in the direction of the arrows on the line 2—2 of FIG. 1, showing the container for the biological or other fluids, the rotatable mass and associated parts and also illustrating the rotatable mass in its normal operating position in full lines and in elevated position in dotted lines.
Figure 3:
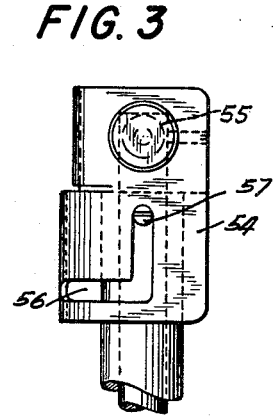
FIG. 3 is a detailed view from the left side of FIG. 2, showing the end of the supporting arm for the rotatable mass and the associated mechanism.

The paddle 15 is arranged so that when it is in operative position, it projects downwardly into the recess or well and is disposed diametrically thereof and presents a constant predetermined surface area to the fluid disposed in the well or recess. Since the preferred form of well shown in FIGS. 1 and 2 is annular in form, the paddle is bifurcated as shown with the two portions disposed in diametrically opposite portions of the annular recess. It will be seen that the paddle 15 may be readily removed and replaced by releasing the set screw 48 and withdrawing the shaft 47 from the bore in the cam and collar assembly. Thus the paddle may be cleaned and sterilized after the completion of a test. As in the case of the cup, the paddle may be disposable so that it can be discarded after each test and replaced with a new paddle. A disposable paddle may be inexpensively made by molding from plastic material.

Arm 36 is arranged so that the rotatable mass may be shifted between operative position, as shown in full lines in FIGS. 1 and 2, and inoperative position, as shown in dotted lines in the same figures. Thus the arm may be mounted on the end of a shaft 50 supported in the tubular column 52. Due to this arrangement the bracket arm 36 may be shifted vertically upwardly to the position shown in dotted lines in FIG. 2 clearing the lower end of the paddle with respect to the sides of the cup 12. The arm may then be pivoted in a counterclockwise direction giving free access to the cup and permitting removal thereof. The movement of the arm between operative and inoperative positions may be guided by a suitable template or cam plate 54 mounted at the opposite end of the arm from the rotatable mass by means of the knurled set screw 55. The cam plate has a right angle slot 56 formed therein which serves as a track or a guide for the pin 57 mounted in the column 52 and projecting outwardly through the slot. When the arm is shifted vertically upwardly, the pin 57 rides in the vertical part of slot 56; and when the arm is rotated, the pin rotates in the horizontal portion of the slot. It will be seen that when the arm is rotated in a counterclockwise direction, the horizontal portion of the slot in engagement with pin 57 serves to hold the arm and rotatable mass in elevated position.

The motor for the indicator or timer 16, which is shown at 58, and also the motor 30 for rotating the cup are automatically controlled by means of a switch operated by the rotatable mass. The switch preferably takes the form of a micro-switch 60, and it is mounted on the bracket arm 36 as shown in FIGS. 1 and 2. The illustrated micro-switch is one well known type and is operated by means of a spring-loaded pin 61 which normally projects outwardly to open the switch. The pin 61 in turn is operated by means of the switch arm 62 mounted as shown at 63 for hinged or pivotal movement so that it may be shifted from the position shown at FIG. 5 projecting outwardly at an angle with the switch in open position to the position shown in FIG. 4 approaching a parallel relationship with the side of the switch and with the pin 61 pressed inwardly to close the switch. At the opposite end of switch arm 62 from its mounting is the follower 64 in the form of a roller which engages the cam profile 43 of the cam flange 44. The relationship between the switch arm and the cam should be designed so that the force acts axially and does not oppose rotation. Thus it will be seen that the switch arm is generally parallel to a tangent drawn to the circle of rotation of the cam flange and that the hinged mounting 63 and the follower 64 are disposed on opposite sides respectively to that portion of the switch arm which would be inter-sected by a perpendicular radius from the center of rotation of the cam. Under the circumstances any slight variation in the switch characteristics have substantially no effect upon the resistance to rotation of the rotatable mass.

The relationship between the cam profile 43 and the follower 64 is such that, when the rotatable mass 14 is rotated in a counterclockwise direction to cause the follower 64 to engage the stop 45 providing the limit of movement in that direction of rotation, the switch will be retained in closed position as shown in FIG. 4 by the inter-engagement between the follower and cam track. This is the normal initial position of the apparatus at the beginning of a test cycle. If the test requires preheating of the biological or other fluid and container, the heater switch 22 is turned on for a sufficient period of time prior to the test to cause the necessary heating. To begin the cycle of operation, the motor switch is then turned on and the fluid to be tested is inserted in the cup with the rotatable mass and paddle 15 disposed in the position shown in full lines in FIGS. 1 and 2.

In the case of blood coagulation and clotting time tests and prothrombin activity tests, the rotation of the blood and plasma in the cup will not initially cause the rotation of paddle 15 and rotatable mass 14. However, when coagulation or clotting takes place, the force exerted by the clotted liquid will overcome the resistance to rotation of the rotatable mass with the result that it will be caused to rotate in a clockwise direction. As the cam follower rides along the cam track, it will initially be held in closed position as shown in FIG. 4. However, when the follower reaches the recess 65 in the cam track, it will immediately and instantaneously move outwardly into engagement with the recess to the position shown in FIG. 5 with the result that the micro-switch 60 will open. The entry slope into recess 65 should be such that the shifting of the follower 64 and the opening of the micro-switch will be instantaneous without undue time delay. As shown, the recess terminates in a further stop 45 which prevents any further rotation of the cam or of the rotary mass.

As previously pointed out, the indicator 16 is preferably in the form of a timer and the timer operation is preferably coordinated with the rotation of cup 12. The cup 12 is preferably rotated at the rate of 2 seconds per rotation, and the timer may accordingly be arranged to indicate tenths of seconds, seconds, and minutes. Thus, the first opening at the right shown by the numeral 80 registers tenths of seconds, and the next two openings 81 indicate seconds, while the remaining openings may indicate minutes. At the beginning of each cycle of operation, the timer may be reset to zero by means of manual reset 17.

The electrical circuits for my apparatus are shown in FIGS. 6 and 7. FIG. 6 shows the heater circuit in which the current supplied through plug 66 travels through lead 67, switch 22, heater 24, thermostat 25, and lead 68 back to the source of current. Thus when the manual switch 22 is closed, the heater circuit is closed; and since the thermostat 25 is connected in series with the heater, it will control the operation thereof. The thermostat, of course, is set to provide the desired temperature for the biological fluid which in the case of blood coagulation and clotting tests and prothrombin activity tests is approximately 37° C.

The pilot light 26 is connected in parallel with the heater and thermostat by leads 69 and 70. Thus whenever switch 22 is closed, the pilot light will be in operation even though the thermostat might have temporarily shut off the circuit of the heater.

FIG. 7 shows the electrical circuit for the motors 30 and 58 for causing the rotation of cup 12 and the operation of the indicating device or timer 16. The current is supplied through plug 72, lead 73, manual switch 18, and micro-switch 60 to the motors 30 and 58. From the motors the current travels through lead 74 back to plug 72 and the source of current. Thus when manual switch 18 is closed and the rotary mass is rotated to its extreme position in a counterclockwise direction to close micro-switch 60, the two motors 30 and 58 will be caused to operate, and this operation normally continues until the rotary mass is caused to rotate in a clockwise direction to open micro-switch 60. Pilot light 20 is connected in parallel with the motors and micro-switch by means of leads 75 and 76. Thus whenever manual switch 18 is closed, the pilot light will be in operation even though the micro-switch might be open.

The operation of the device shown in FIGS. 1 to 7 inclusive is as follows: Arm 36 supporting the rotatable mass is shifted upwardly and rotated in a counterclockwise direction to the position shown in FIG. 1 in dotted lines. A clean cup 12 and a clean paddle 15 are then inserted for use. In this connection the cup and paddle are the only portions of the apparatus which come in contact with the biological fluid being tested. They are cleaned and sterilized to prevent contamination after each cycle of operation, or in the case of disposable units a new cup and paddle are inserted for each new test.

In conducting a blood coagulation and clotting time test, the arm 36 is rotated in a clockwise direction and lowered to the position shown in full lines in FIGS. 1 and 2 and switch 22 is turned on to cause the heater to raise the temperature of the cup to the desired level. Handle 17 of the timer is rotated to return the indicator to zero time, and the rotary mass is rotated to the extreme limit of its movement in a counterclockwise direction to close the micro-switch. Switch 18 is turned on so as to cause the cup to rotate and the timer to operate and at the same time approximately 1 cc. of blood is drawn and immediately placed in the cup. The relationship between the speed of rotation of the blood in the cup, the resistance to rotation of the rotary mass, and the surface area of paddle 15 exposed to the blood should be such that initially the rotation of the blood will not cause rotation of the rotary mass. However, when clotting occurs, the force exerted upon the paddle is sufficient to overcome the resistance to rotation with the result that the rotary mass will be caused to rotate in a clockwise direction until follower 64 engages recess 65 of the cam profile. This in turn causes micro-switch 60 to open with the result that the rotation of the cup and the operation of the timer will stop indicating the completion of the test. The timer will show the exact time between the commencement and the completion of the test.

It will be appreciated that the apparatus can be standardized by timing the operation against standard blood samples of known coagulation or clotting time. It is desirable to arrange the resistance to rotation and the size of the paddle area so as to obtain a clotting time operation comparable to the time obtained in presently used clotting time tests. Thus the coagulation or clotting time of normal blood samples should be between 6 and 12 minutes. By decreasing the resistance to rotation or increasing the paddle area in engagement with the body fluid, the length of the cycle of operation can be decreased; and by increasing the resistance to rotation and decreasing the paddle area, the length of the cycle of operation can be increased.

In the case of prothrombin activity tests, the cup and paddle are similarly replaced with a new or clean cup and paddle. The paddle is lowered into engagement with the cup as shown in full lines in FIGS. 1 and 2, and the rotary mass is rotated in a counter clockwise direction to close the micro-switch. Also, the switch 22 for the heater is turned on and the timer is returned to its zero position. Approximately 0.1 cc. of plasma and 0.2 cc. of reagent are pipetted into the cup and switch 18 is turned on. Initially the rotation of the cup and plasma will not cause rotation of the paddle and of the rotatable mass. However, when clotting occurs, the paddle and rotatable mass are caused to rotate in a clockwise direction until the micro-switch is opened, which causes the cup to stop rotating and the timer to shut off. The timer indicator will then show the time for completing the test. As in the case of the blood coagulation and clotting time test the apparatus should be checked against known specimens of plasma so as to give corresponding time cycles as are obtained from the tests presently in use. In other words, normal plasma should show a clotting time of approximately 15 seconds.

For each type of test similar paddles and cups should be employed in conducting successive tests so as to insure uniformity of results.

My apparatus may also be used for conducting other types of tests on biological or other fluids. Thus it may be used for testing viscosity or changes in viscosity. In this case the apparatus is arranged so that the rotatable mass will be caused to rotate when the viscosity of the fluid rises above a critical level. Below the critical level the rotating cup and liquid will not cause the paddle and rotatable mass to rotate.

My apparatus may also be used for disassociation or sedimentation tests. For this purpose I preferably use a cup and paddle of the type shown in FIG. 8. Thus the cup 12' has a central well or recess rather than an annular well or recess and the paddle 15 is in the form of a perforated diametrically-disposed vane, which is positioned in the well or recess when the apparatus is in operation. The size of the apertures in the paddle and the size of the paddle relative to the rotating body of liquid are coordinated so that initially the rotation of the liquid will not cause rotation of the paddle and the rotatable mass. As sedimentation occurs, the sediment settles downwardly in the liquid and agglomerates into heavier particles and finally exerts sufficient force against the paddle to cause it to rotate and open the microswitch 60. The timer will then indicate the sedimentation time.

The apparatus either in its present form or with slight modification may also be used for conducting other tests on body fluids, such as blood fibrility tests.

It will thus be seen that I have provided an improved apparatus for testing biological and other fluids which is particularly useful in measuring changes in characteristics in such fluids. Modifications may be made in the disclosed and illustrated embodiments of my invention without departing from my invention as set forth in the accompanying claims.

I claim:

1. Apparatus for use in testing biological and other fluids to determine characteristics, such as coagulation or clotting time, prothrombin activity, or viscosity, which comprises a container mounted for rotary motion and cooperable to hold a predetermined quantity of liquid to be tested in an arrangement of predetermined dimensions, means for rotating the container at a constant predetermined rate of speed, and a rotatably-mounted mass of constant inertia presenting constant predetermined initial resistance to rotation and having at least a portion thereof disposed in said container and presenting a relatively broad surface extending generally diametrically of the container so that a constant predetermined surface area thereof will be in engagement with the liquid to be tested, the resistance to rotation of said mass after rotation begins being no greater than said initial resistance.

2. Apparatus for use in testing biological and other fluids to determine characteristics, such as coagulation or clotting time, prothrombin activity, or viscosity, as set forth in claim 1 in which a heater is provided in heat-transfer relationship with the container.

3. Apparatus for use in testing biological and other fluids to determine characteristics, such as coagulation or clotting time, prothrombin activity, or viscosity, as set forth in claim in which the rotatably-mounted mass includes a paddle-like portion presenting a relatively broad surface disposed generally diametrically of the container.

4. Apparatus for use in testing biological and other fluids to determine characteristics, such as coagulation or clotting time, prothrombin activity, or viscosity, as set forth in claim 1 in which the rotatably-mounted mass includes a disposable, releasably-mounted, paddle-like portion presenting a relatively broad surface disposed generally diametrically of the container.

5. Apparatus for use in testing biological and other fluids to determine characteristics, such as coagulation or clotting time, prothrombin activity, or viscosity, as set forth in claim 1 in which the container has an annular well for receiving and holding the biological fluids and the rotatably-mounted mass includes a bifurcated paddle-like portion disposed in diametrically opposite sides of said well.

6. Apparatus for use in testing biological and other fluids to determine characteristics, such as coagulation or clotting time, prothrombin activity, or viscosity, as set forth in claim 1 in which the container is a disposable, removably-mounted unit.

7. Apparatus for use in testing biological and other fluids to determine characteristics, such as coagulation or clotting time, prothrombin activity, or viscosity, as set forth in claim 1 having indicating means and control means for causing the operation of the indicating means positioned in operative engagement with said rotatable means for indicating when said mass has rotated a predetermined distance in the direction of rotation of said container.

8. Apparatus for use in testing biological and other fluids to determine changes in characteristics, such as coagulation or clotting time, prothrombin activity, or changes in viscosity which comprises a container mounted for rotary motion and cooperable to hold a predetermined quantity of the liquid to be tested in an arrangement of predetermined dimensions, means for rotating the container at a constant predetermined rate of speed, and a rotatably-mounted mass having a paddle-like portion presenting a relatively broad surface disposed generally diametrically of the container so as to be in engagement with the liquid being tested, said mass having a constant inertia and presenting constant predetermined initial resistance to rotation greater than the force initially presented by said biological fluid when it first starts rotating but less than that presented by the fluid after the characteristic to be tested has changed, the resistance to rotation of said mass after rotation begins being no greater than said initial resistance.

9. Apparatus for use in testing biological and other fluids to determine changes in characteristics, such as coagulation or clotting time, prothrombin activity, or changes in viscosity, which comprises a container mounted for rotary motion and having an annular well for receiving and holding the biological fluid, means for rotating the container at a constant predetermined rate of speed, and a rotatably-mounted mass having a bifurcated paddle-like portion disposed in diametrically opposite sides of said well so as to be in engagement with the liquid being tested, said mass having a constant inertia and presenting a constant predetermined initial resistance to rotation greater than the force initially presented by the biological fluid when it first starts rotating but less than that presented by the fluid after the characteristic to be tested has changed, the resistance to rotation of said mass after rotation begins being no greater than said initial resistance.

10. Apparatus for use in testing biological and other fluids to determine characteristics, such as coagulation or clotting time, prothrombin activity or viscosity which comprises: a container mounted for rotary motion and cooperable to hold a predetermined quantity of the liquid to be tested in an arrangement of predetermined dimensions, means for rotating the container at a constant predetermined rate of speed, a rotatable mass having a paddle-like portion presenting a relatively broad surface area, means for supporting said rotatable mass for rotary motion, and means for supporting said last-named means so that it and said rotary mass may be shifted from operative position with the paddle projecting a predetermined distance into said container to inoperative position with the paddle elevated above and disposed to one side of the container.

11. Apparatus for use in testing biological and other fluids to determine characteristics, such as coagulation or clotting time, prothrombin activity or viscosity as set forth in claim 10 in which the rotatable mass has a constant predetermined initial resistance to rotation with the resistance to rotation of said mass after rotation begins being no greater than said initial resistance.

12. Apparatus for use in testing biological and other fluids to determine characteristics, such as coagulation or clotting time, prothrombin activity or viscosity which comprises: a container cooperable to hold a predetermined quantity of the liquid to be tested in an arrangement of predetermined dimensions, a rotatable mass having a paddle-like portion presenting a relatively broad surface area, bearing means for supporting said rotatable mass for rotary motion, said rotatable mass and said container being rotatable relative to each other, means for causing relative rotation between said rotatable mass and said container, and means for supporting said bearing means so that the bearing means and said rotatable mass may be shifted from operative position with the paddle projecting a predetermined distance into said container to inoperative position with the paddle elevated above and disposed to one side of the container.

13. Apparatus for use in testing biological and other fluids to determine characteristics, such as coagulation or clotting time, prothrombin activity or viscosity which comprises: a container cooperable to hold a predetermined quantity of the liquid to be tested in an arrangement of predetermined dimensions, a rotatable mass having a paddle-like portion presenting a relatively broad surface area, bearing means for supporting said rotatable mass for rotary motion, said rotatable mass and said container being rotatable relative to each other, means for causing relative rotation between said rotatable mass and said container, and means for supporting said bearing means and including an arm having a pivotal mounting providing for both vertical and horizontal shifting of the arm so that the bearing means and said rotary mass may be shifted from operative position with the paddle projecting a predetermined distance into said container to inoperative position with the paddle elevated above and disposed to one side of the container.

14. Apparatus for use in testing biological and other fluids to determine characteristics, such as coagulation or clotting time, prothrombin activity or viscosity which comprises: a container mounted for rotary motion and formed to hold a predetermined quantity of liquid to be tested in an arrangement of predetermined dimensions, means for rotating the container at a constant predetermined rate of speed, a rotatably mounted mass of constant inertia presenting constant predetermined initial resistance to rotation and having at least a portion thereof disposed in said container so that a constant predetermined surface area thereof will be in engagement with the liquid being tested, timing mechanism for timing the rotation of the container, means including an electrical circuit for causing the operation of the timer, switch means for controlling said circuit and means having operative engagement with said rotatable mass for controlling the switch so as to open said circuit and stop the operation of the timer when the rotatable mass is rotated a predetermined distance.

15. Apparatus for use in testing biological and other fluids to determine characteristics, such as coagulation or clotting time, prothrombin activity or viscosity which comprises: a container mounted for rotary motion and cooperable to hold a predetermined quantity of liquid to be tested in an arrangement of predetermined dimensions, means including a motor for rotating the container at a constant predetermined rate of speed, a rotatably mounted mass of constant inertia presenting constant predetermined initial resistance to rotation and having at least a portion thereof disposed in said container so that a constant predetermined surface area thereof will be in engagement with the liquid being tested, an electrical circuit including switch mechanism for causing the operation of said motor and means for controlling said switch and having operative engagement with said rotatable mass to open the circuit of said motor when the rotatable mass has rotated a predetermined distance.

16. Apparatus for use in testing biological and other fluids to determine characteristics, such as coagulation or clotting time, prothrombin activity or viscosity which comprises: a container mounted for rotary motion and cooperable to hold a predetermined quantity of liquid to be tested in an arrangement of predetermined dimensions, means for rotating the container at a constant predetermined rate of speed, and a rotatably mounted mass of constant predetermined initial resistance to rotation and having at least a portion thereof disposed in said container so that a constant predetermined surface area thereof will be in engagement with the liquid being tested, indicating means, means including an electrical circuit and switch mechanism for causing the operation of the indicating means, a cam associated with said mass so as to rotate therewith, and a switch arm in operative engagement with said cam for causing the operation of the switch when the cam has rotated a predetermined distance and to control the operation of the indicating means.

17. Apparatus for use in testing biological and other fluids to determine characteristics, such as coagulation or clotting time, prothrombin activity or viscosity as set forth in claim 16 in which the switch arm is pivotally mounted substantially parallel to a tangent to the circle of rotation of said cam with the pivotal mounting being disposed at one side of the portion of the switch arm which is intersected by a perpendicular radius from the center of rotation of the cam and said switch arm is provided with a follower in engagement with the cam and which is disposed on the opposite side of that portion of the switch arm which would be intersected by the perpendicular radius whereby the effective variations in the force exerted by the follower on the cam is minimized.

References Cited in the file of this patent

UNITED STATES PATENTS

| 2,382,979 | Demb | Aug. 21, 1945 |
| 2,423,687 | Davis et al. | July 8, 1947 |
| 2,437,194 | Harrington | Mar. 2, 1948 |
| 2,497,919 | Weltmann | Feb. 21, 1950 |

FOREIGN PATENTS

| 844,362 | Germany | July 21, 1952 |
| 1,103,997 | France | June 1, 1955 |